United States Patent [19]

Widmer

[11] Patent Number: 5,416,288
[45] Date of Patent: May 16, 1995

[54] MULTIPLE SPOT RESISTANCE WELDING MACHINE FOR WELDING WIRE GRIDS

[75] Inventor: Robert Widmer, Hausen, Switzerland

[73] Assignee: H. A. Schlatter AG., Schlieren, Switzerland

[21] Appl. No.: 130,465

[22] Filed: Oct. 1, 1993

[30] Foreign Application Priority Data

Nov. 11, 1992 [CH] Switzerland ............ 3482/92

[51] Int. Cl.⁶ .................. B23K 11/24; B23K 11/11
[52] U.S. Cl. .................... 219/56; 219/108; 219/116
[58] Field of Search ............ 219/56, 108, 116

[56] References Cited

U.S. PATENT DOCUMENTS

| | | | |
|---|---|---|---|
| 3,139,504 | 6/1964 | Ramstein et al. | 219/56 |
| 3,725,632 | 4/1973 | Ritter et al. | 219/116 |
| 5,072,090 | 12/1991 | Morita | 219/108 |

FOREIGN PATENT DOCUMENTS

| | | | |
|---|---|---|---|
| 8334723 | 2/1988 | Germany. | |
| 57-137085 | 8/1982 | Japan | 219/116 |
| 59-24586 | 2/1984 | Japan | 219/116 |
| 633738 | 12/1982 | Switzerland. | |
| 2249747 | 5/1992 | United Kingdom. | |

OTHER PUBLICATIONS

Patent Abstract of Japan Published May 2, 1986, vol. 10, No. 118 of Japan 60–247482 Dec. 1985.

*Primary Examiner*—Geoffrey S. Evans
*Attorney, Agent, or Firm*—Brady, O'Boyle & Gates

[57] ABSTRACT

A multiple spot resistance welding machine for the welding of wire grids by direct current comprises several contact electrodes (4.1.1, 4.2.1, 4.1.2, 4.2.2, ...) contacting a respectively associated grid point from both sides. The switching arrangement for the simultaneous application of welding current to all contacted grid points exhibits, for each contact electrode pair (4.1.1/4.2.1, ..., 4.1.5/4.2.5), a welding transformer. Juxtaposed welding electrode pairs are floating with respect to potential in accordance with this invention so that the sole transverse connection is constituted by the transverse wire (1). A separate contact electrode pair is provided for each grid point.

7 Claims, 1 Drawing Sheet

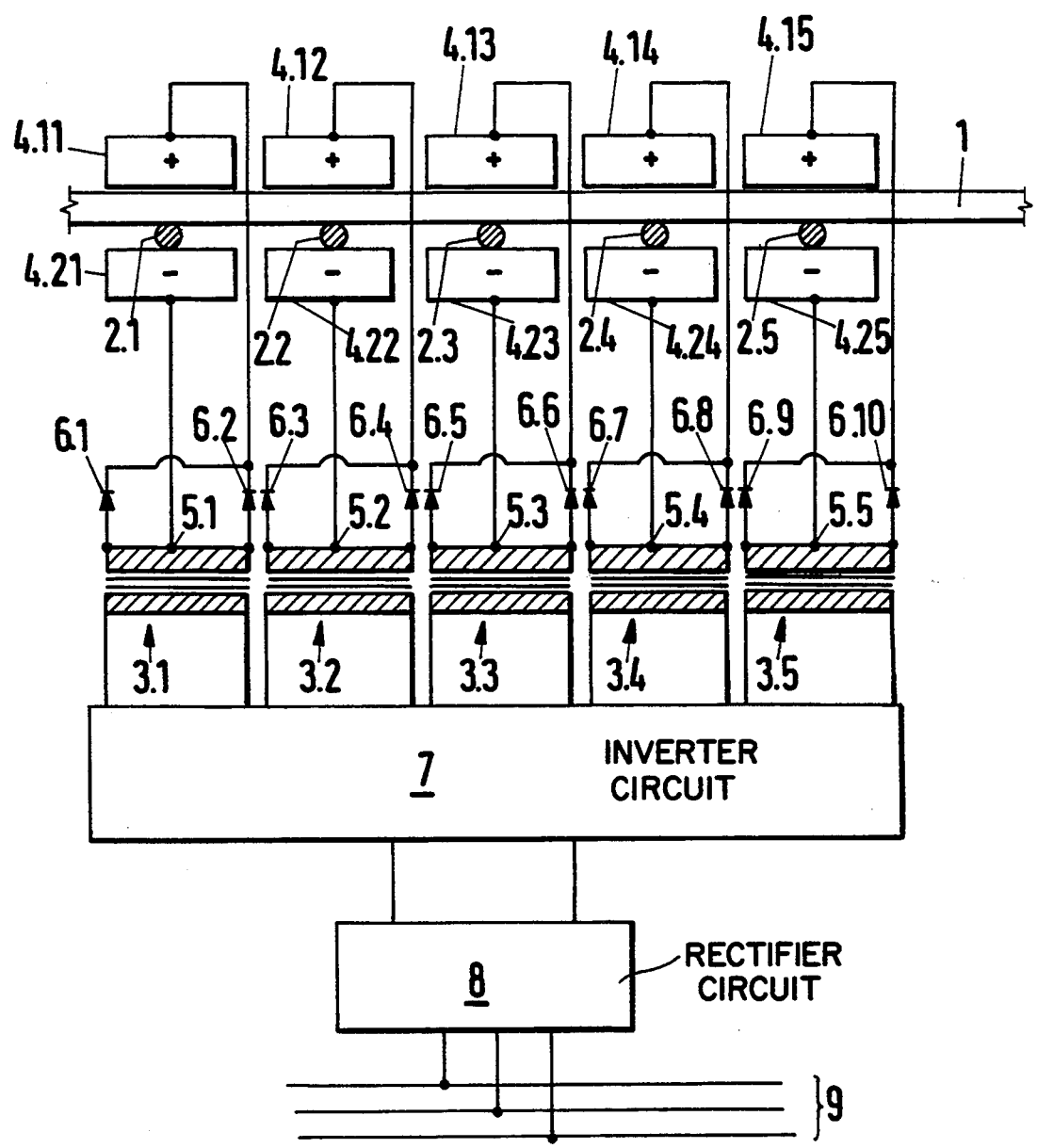

MULTIPLE SPOT RESISTANCE WELDING MACHINE FOR WELDING WIRE GRIDS

FIELD OF ART

The invention relates to a multiple point resistance welding machine for welding wire grids by means of direct current, comprising a contact electrode arrangement for the simultaneous contacting of all grid points of the wire grid pertaining to a transverse wire to be welded on and a switching arrangement with several welding transformers for the simultaneous application of welding current to all contacted grid points.

STATE OF THE ART

A resistance welding machine of the above-described type has been known, for example, from Swiss Patent 633,738. A plurality of so-called jockey electrodes is seated on two bus bars extending over the entire width of the welding machine. Such a jockey electrode is provided for each grid point of the transverse wire to be welded. The oppositely located contact beam carries a number of current bridges, each joining respectively two neighboring grid points.

It has now been found that, on account of shunts, the conventional resistance welding machine must provide a considerably larger quantity of electrical power than actually required for the welding operation. This problem becomes acute, in particular, in case close-meshed grids having large wire cross sections must be welded. In such applications, it would be desirable to be able to individually monitor or adjust the welding current flowing in each grid point. A complete decoupling however, is made impossible by the already welded portion of the grating that is being worked on.

Direct current resistance welding machines have been known having several spot welding pincers wherein the individual weld spots can be monitored individually. Attention is invited, in this connection, to U.S. Pat. No. 5,072,090 or British Patent No. 2,249,747, for example. With the aid of suitably actuated inverter circuits, the weld spots can be welded independently of one another. This, though, is possible only with chronological staggering so that even with close staggering a welding step can be realized by means of the various pincers that is at most virtually simultaneous, but not actually simultaneous.

This may be adequate when sheet-metal structures are welded together. When welding grid mats, simultaneous welding of all grid points of a transverse wire is absolutely necessary on account of the, in part, considerable welding stroke of 1 to 2 mm.

REPRESENTATION OF THE INVENTION

It is an object of the invention to indicate a device of the type discussed hereinabove which is also suitable for the welding of close-meshed grids with large wire cross sections.

According to the invention, this object has been attained by providing that the contact electrode arrangement exhibits several welding electrode pairs contacting their respectively associated grid point from both sides, and that the switching arrangement is designed so that juxtaposed welding electrode pairs are floating relatively to each other with respect to potential.

Accordingly, the invention abolishes continuously extending bus bars. On account of the fact that the welding electrode pairs float with regard to potential, there are minimal differences in potential and accordingly minimal shunt currents during the welding operation.

Preferably, each electrode pair is connected into a secondary circuit of respectively one welding transformer, not fixed with respect to potential. In other words: The transverse wire itself represents in each case the only transverse connection.

Advantageously, the mutually independent pairs of electrodes are coordinated, in a suitable spacing pattern, with a mesh width of the wire grid in such a way that each grid point to be welded is welded by its own electrode pair. In case of especially small mesh widths, it is also possible in certain cases to contact, per electrode pair, even two or more grid points without losing the effect according to this invention. The relevant aspect in this connection is the ratio of spacing of the longitudinal wires (and thus of the grid points) to the cross-sectional area of the transverse wire.

The spacing pattern is typically smaller than 15 cm, preferably 10 cm or smaller, and 8 cm or less in case of particularly narrow mesh. The minimum spacing pattern is determined by the minimum size of the circuit arrangement (especially of the transformers). In most instances, 5, 7.5 and 10 cm should represent a satisfactory compromise.

According to an advantageously simple embodiment, the welding transformers are connected on the primary side to two phases of a three-phase supply network wherein the connections are varied cyclically over the width of the machine.

In order to be able to operate with smaller transformers, it may be advantageous to employ a medium-frequency circuit (400–1,000 Hz).

BRIEF DESCRIPTION OF THE DRAWINGS

The single FIGURE shows schematically a circuit arrangement for a grid welding machine according to this invention.

WAYS OF EXECUTING THE INVENTION

A transverse wire 1 is to be welded to several longotudinal wires 2.1, . . . , 2.5 located perpendicularly thereto. According to an especially preferred embodiment of the invention, a separate pair of contact electrodes 4.1.1, 4.2.1, 4.1.2, 4.2.2, . . . , 4.1.5, 4.2.5, respectively, is provided for each grid point (i.e. point of intersection between longitudinal wire and transverse wire). The positive pole, i.e. in the present example the contact electrodes 4.1.1, 4.1.2, . . . in each case contacts the transverse wire 1 (from above) while the negative pole, i.e. the contact electrodes 4.2.1, 4.2.2, each contacts a longitudinal wire 2.1, 2.2, . . . from below. With the aid of pneumatic cylinders, springs, or other force generators, the effect is brought about that the longitudinal wires 2.1, . . . , 2.5 are pressed satisfactorily against the transverse wire 1 at each contact electrode pair 4.1.1/4.2.1 and 4.1.2/4.2.2, . . . , respectively.

Each contact electrode pair 4.1.1/4.2.1, 4.1.2/4.2.2, . . . is associated with a transformer 3.1, . . . , 3.5 with a central tap 5.1, . . . , 5.5 on the secondary side. The central tap 5.1, 5.2, . . . is in each case connected to the negative pole (i.e. the contact electrode 4.2.1, 4.2.2, . . . ). The positive pole (i.e. the contact electrodes 4.1.1, 4.1.2, . . . ) is in each case connected to the end taps of the secondary side via rectifier elements 6.1, 6.2, and, respectively, 6.3, 6.4, . . . , 6.10 (semiconductor diodes). Thus, welding is performed with rectified current.

On the primary side, the transformers 3.1, . . . , 3.5 are connected to an inverter circuit 7. The latter, in turn, is connected to a rectifier circuit 8. Energy is supplied by a three-phase network 9.

According to the invention, the individual contact electrode pairs are not fixed in potential relatively to one another but rather are floating. During the welding step, the transverse wire 1 then represents the only transverse connection. The width of the individual contact electrodes 4.1.1, . . . , 4.1.5, 4.2.1, . . . , 4.2.5 is, in any event, somewhat smaller than the distance of neighboring longitudinal wires, e.g. 2.1, 2.2. Widths of less than 10 cm are preferred. The invention deploys its effect especially well with widths of 7.5 or even 5 cm. In case of still smaller mesh widths, technical obstacles can be expected (production of high welding currents in constricted space conditions) which, though, does not render the principle of the invention questionable. With very small mesh widths, it is possible under some circumstances to tolerate simultaneous contacting of two or more grid points by one welding electrode pair.

Preferably, the individual contact electrodes are rather narrow and are arranged to be laterally displaceable on a supporting structure. It is thereby possible (for example by loosening setscrews) to adjust the grid welding machine to diverse mesh widths with small expenditure.

The inverter switching arrangement 7, though supplying all of the transformers 3.1, . . . , 3.5 simultaneously with current, preferably permits an individual adjustment of the node currents. This can be realized in various ways. The inverter switching arrangement 7 is operated at medium frequency (typically 400–1000 Hz). Although this means an increased expenditure in circuitry, it permits the transition to smaller tranformers. In principle, however, the welding transformers can also be connected directly to the phases of a three-phase network via thyristor current sites.

In summation, it can be stated that a uniformly high quality of all weld spots results with the use of grid welding machines according to this invention. With small mesh widths and large wire cross sections, this result can be attained at high efficiency (small shunt currents, no penetration sites on the electrode coatings).

I claim:

1. A multiple spot resistance welding machine for welding wire grids by means of direct current, comprising a plurality of contact welding electrode pairs (4.11/4.21, 4.12/4.22, . . . , 4.15/4.25) each connected for simultaneously contacting from both sides a respective grid point of all grid points of a wire grid pertaining to a transverse wire (1) to be welded on the wire grid, and switching circuit means having a plurality of welding transformers respectively connected to said plurality of contact welding electrode pairs for the simultaneous application of welding current to all contacted grid points, and for supplying floating potential to juxtaposed contact welding electrode pairs of the plurality of contact welding electrode pairs.

2. Multiple spot resistance welding machine according to claim 1, in which each contact welding electrode pair (4.1.1/4.2.1, . . . , 4.1.5/4.2.5) is connected into an independent secondary circuit, not fixed with respect to potential, of respectively one said welding transformer (3.1., . . . , 3.5).

3. Multiple spot resistance welding machine according to claim 1, in which the contact welding electrode pairs (4.1.1/4.2.1, . . . , 4.1.5/4.2.5) are coordinated, in a spacing pattern, with a mesh width of the wire grid in such a way that each grid point is welded by its own contact electrode pair.

4. Multiple spot resistance welding machine according to claim 3, in which the spacing pattern of the grid points and juxtaposed contact welding electrode pairs amounts to less than 15 cm.

5. A multiple spot resistance welding machine according to claim 3, in which the spacing pattern of the grid points and juxtaposed contact welding electrode pairs is at most 10 cm.

6. A multiple spot resistance welding machine according to claim 3, in which the spacing pattern of the grid points and juxtaposed contact welding electrode pairs is in the range of 5 cm–10 cm.

7. A multiple spot resistance welding machine for welding wire grids by means of direct current, comprising a three-phase supply network, a plurality of contact welding electrode pairs (4.11/4.21, 4.12/4.22, . . . , 4.15/4.25) each connected for simultaneously contacting from both sides a respective grid point of all grid points of a wire grid pertaining to a transverse wire (1) to be welded on the wire grid, and switching circuit means having a plurality of welding transformers respectively connected to said plurality of contact welding electrode pairs for the simultaneous application of welding current to all contacted grid points, and for supplying floating potential to juxtaposed contact welding electrode pairs of the plurality of contact welding electrode pairs, said switching circuit means including thyristor means for each of said welding transformers, and each welding transformer of said plurality of welding transformers having a primary winding connected by a said thyristor means to two phases of said three-phase supply network, wherein the connections vary cyclically over the width of the machine.

* * * * *